United States Patent
Bilous et al.

(10) Patent No.: US 11,789,527 B1
(45) Date of Patent: Oct. 17, 2023

(54) EYEWEAR DEVICE EXTERNAL FACE TRACKING OVERLAY GENERATION

(71) Applicants: Kostiantyn Bilous, Santa Monica, CA (US); Stanislav Minakov, Playa Vista, CA (US)

(72) Inventors: Kostiantyn Bilous, Santa Monica, CA (US); Stanislav Minakov, Playa Vista, CA (US)

(73) Assignee: Snap Inc., Santa Monica, CA (US)

( * ) Notice: Subject to any disclaimer, the term of this patent is extended or adjusted under 35 U.S.C. 154(b) by 128 days.

(21) Appl. No.: 16/950,045

(22) Filed: Nov. 17, 2020

Related U.S. Application Data

(60) Provisional application No. 62/948,986, filed on Dec. 17, 2019.

(51) Int. Cl.
| | |
|---|---|
| G06F 3/01 | (2006.01) |
| G09G 5/377 | (2006.01) |
| G06N 20/00 | (2019.01) |
| G02B 27/01 | (2006.01) |
| G06V 40/16 | (2022.01) |
| G06F 18/214 | (2023.01) |

(52) U.S. Cl.
CPC ......... *G06F 3/012* (2013.01); *G02B 27/0172* (2013.01); *G06F 18/214* (2023.01); *G06N 20/00* (2019.01); *G06V 40/161* (2022.01); *G06V 40/171* (2022.01); *G09G 5/377* (2013.01); *G02B 2027/014* (2013.01); *G02B 2027/0138* (2013.01); *G02B 2027/0178* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 9,832,452 | B1 * | 11/2017 | Fotland | G06F 3/0304 |
| 11,119,326 | B1 * | 9/2021 | Rodriguez, II | G06F 3/013 |
| 2013/0117377 | A1 * | 5/2013 | Miller | G06F 16/954 |
| | | | | 709/205 |
| 2016/0360970 | A1 * | 12/2016 | Tzvieli | A61B 5/0075 |
| 2017/0287194 | A1 * | 10/2017 | Katz | H04N 5/33 |
| 2018/0139203 | A1 * | 5/2018 | Dolan | G06V 20/20 |
| 2019/0095164 | A1 * | 3/2019 | Yamaura | G10L 15/26 |
| 2020/0065559 | A1 * | 2/2020 | Vats | G06V 40/20 |
| 2021/0098837 | A1 * | 4/2021 | Ash | G02C 11/10 |

OTHER PUBLICATIONS

Rekimoto et al. "Behind-the-Mask: A Face-Through Head-Mounted Display" (Year: 2018).*

* cited by examiner

*Primary Examiner* — Hilina K Demeter
(74) *Attorney, Agent, or Firm* — Culhane Meadows PLLC; Stephen J. Weed

(57) ABSTRACT

A wearable or a mobile device includes a camera to capture an image of a scene with a face and a display for displaying an image overlaid on the face. Execution of programming by a processor configures the device to perform functions, including functions to capture, via a camera of an eyewear device, an image of a scene including a face, identify the face in the image of the scene, track positional information of the face with respect to the eyewear device, generate an overlay image responsive the positional information, and present the overlay image on an image display.

14 Claims, 9 Drawing Sheets

EYEWEAR DEVICE EXTERNAL FACE TRACKING OVERLAY GENERATION

CROSS-REFERENCE TO RELATED APPLICATIONS

This application claims priority to U.S. Provisional Application Ser. No. 62/948,986 entitled EYEWEAR DEVICE FACE TRACKING, filed on Dec. 17, 2019, the contents of which are incorporated fully herein by reference.

TECHNICAL FIELD

The present subject matter relates to wearable devices, e.g., eyewear devices, and, more particularly, to facial detection and face tracking.

BACKGROUND

Wearable devices, including portable eyewear devices, such as smart glasses, headwear, and headgear, as well as mobile devices available today integrate image displays and cameras. Such devices are able to capture and present images.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

Figure 1A:
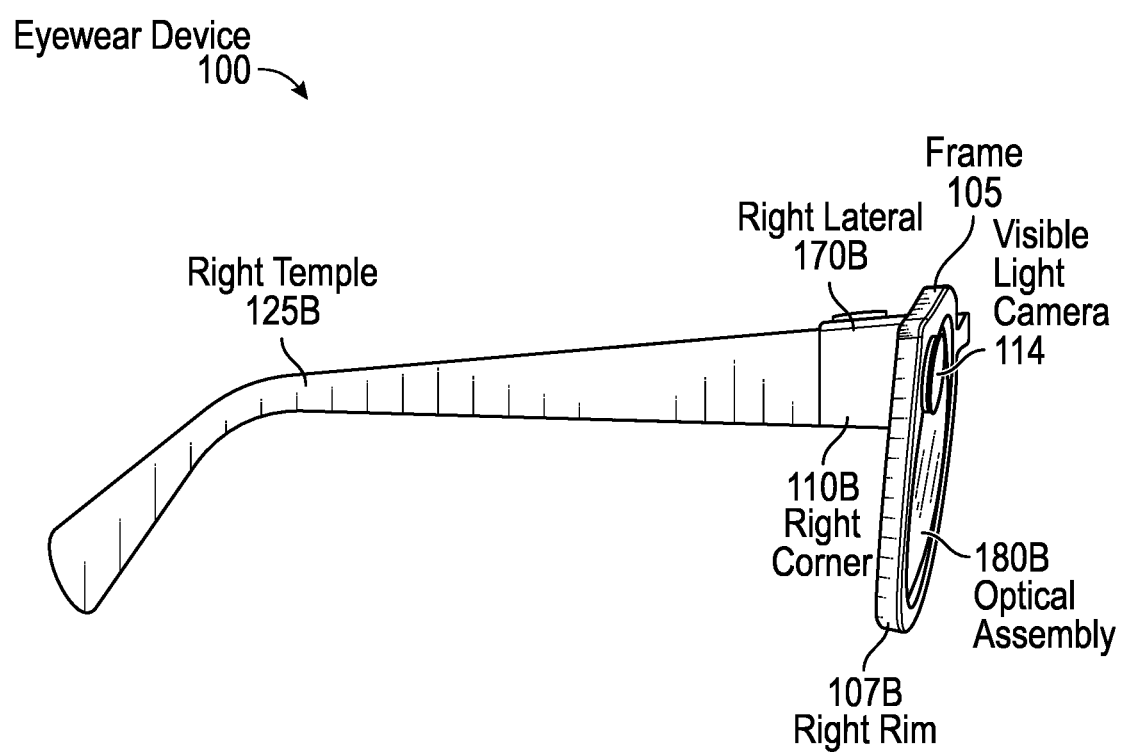
FIG. 1A is a side view of an example hardware configuration of an eyewear device, which includes a visible light camera on a corner.

The following detailed description includes examples for tracking positional information of a face (e.g., including distance from a camera) for use in rendering image overlays on image displays of an eyewear device. In one example, a machine learning model is trained using images including faces having facial features with known positional information. The trained model can be applied to a face in an image to obtain positional information for that face in that image. The obtained positional information may then be used to create image overlays that track the face as the face moves in relation to the eyewear device.

In the following detailed description, numerous specific details are set forth by way of examples in order to provide a thorough understanding of the relevant teachings. However, it should be apparent to those skilled in the art that the present teachings may be practiced without such details. In other instances, description of well-known methods, procedures, components, and circuitry are set forth at a relatively high-level, without detail, in order to avoid unnecessarily obscuring aspects of the present teachings.

The term "coupled" as used herein refers to any logical, optical, physical or electrical connection, link or the like by which electrical signals produced or supplied by one system element are imparted to another coupled element. Unless described otherwise, coupled elements or devices are not necessarily directly connected to one another and may be separated by intermediate components, elements or communication media that may modify, manipulate or carry the electrical signals. The term "on" means directly supported by an element or indirectly supported by the element through another element integrated into or supported by the element.

The orientations of the eyewear device, associated components and any complete devices incorporating a camera such as shown in any of the drawings, are given by way of example only, for illustration and discussion purposes. In operation for a particular face detection programming, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any camera or component of a camera constructed as otherwise described herein.

Objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view of an example hardware configuration of an eyewear device 100, which includes at least one visible light camera 114 on a right corner 110B for capturing images in a field of views. When a face is detected in the images, the face is tracked to create overlay images that may be overlaid on the face for presentation to a wearer of the eyewear device 100.

In the example of FIG. 1A, the visible light camera 114 is sensitive to the visible light range wavelength. As shown in the example, the visible light camera 114 has a front facing field of view from the perspective of a wearer. Examples of such a visible light camera 114 include a high-resolution complementary metal-oxide-semiconductor (CMOS) image sensor and a video graphic array (VGA) camera, such as 640p (e.g., 640×480 pixels for a total of 0.3 megapixels), 720p, or 1080p. The eyewear device 100 captures image sensor data from the visible light camera 114, and optionally other data such as geolocation data, digitizes the data using an image processor, and stores the digitized data in a memory.

Visible light camera 114 may be coupled to an image processor (element 312 of FIG. 3) for digital processing along with a timestamp in which the image of a scene is captured. Image processor 312 includes circuitry to receive signals from the visible light camera 114 and process those signals from the visible light camera 114 into a format suitable for storage in the memory 334. The timestamp can be added by the image processor 312 or other processor, which controls operation of the visible light camera 114. A coupled processor 343 uses algorithms to detect and extract facial features such as faces.

In an example, a system includes the eyewear device 100. The eyewear device 100 includes a frame 105, a right temple 110B extending from a right lateral side 170B of the frame 105, and an image display (e.g., optical assembly 180A and 180B shown in FIGS. 1B and 1C) to present a graphical user interface to a user. The eyewear device 100 further includes a camera (e.g., visible light camera 114) connected to the frame 105 or the right temple 110B to capture an image of a scene including a face. Although not shown in FIGS. 1A, 1B, and 1C, the system further includes a processor (element 343 of FIGS. 3A and 3C) coupled to the eyewear device 100 and connected to the camera 114, a memory 334 accessible to the processor 343, and programming in the memory 334, for example in the eyewear device 100 itself or another part of the system.

Although not shown in FIG. 1A, the system also includes a host computer (element 398 of FIGS. 3A and 3B) that generates a facial feature/parameter model utilizing a machine leaning model such as, for example, neural network programming. The neural network programming generates the facial feature/parameter model (e.g., trains the facial feature/parameter model) by learning features directly from sets of labeled image data without the need for manual feature extraction. The neural network programming executes on the host computer and outputs a model for storage.

As described in further detail below, the facial feature/parameter model, which is trained using detected facial features and associated parameters (e.g., comprising hundreds or thousands of extracted facial features and parameters), also or alternatively resides on the eyewear device 100. The host computer 398 can transmit over the air updates to update the model. In one example, the model is trained using two-dimensional images. In another example, the model is trained using stereo imagery having overlapping fields of view.

In one example, a neural network is used to train the machine learning models. The neural network may be a pre-trained or untrained. An example of a suitable neural network is a convolutional neural network (CNN) running on the host computer that convolves facial features with distance parameters. The CNN may use two-dimensional convolutional layers. The CNN may extract features directly from images. The CNN can learn while the network trains on a collection of images of scenes.

During training of the machine learning model (e.g., neural network programming) of the host computer, multiple images of scenes with faces from various angles with different perspectives are fed into the host computer for processing. Images are also input with different lighting conditions and background scenes. Training the machine learning model examines multiple images and creates a facial feature and parameter model.

After the machine learning of the host computer builds the facial feature/parameter model, the face detection programming of the eyewear device 100 is executed. Execution of the programming by the processor 343 configures the eyewear device 100 to perform functions. The eyewear device 100 captures, via the camera 114, an image of the scene with the face. The eyewear device 100 creates an overlay image; and produces visible output to the user via the graphical user interface presented on the image display (e.g., optical assembly 180A-B) of the eyewear device 100 including the produced overlay.

Feature detection and feature extraction are combined in the machine learning (e.g., neural network programming) of the host computer. Feature detection, feature extraction, and matching are combined in the face detection programming of the eyewear device 100. Facial features can be detected and, once detected, can be extracted. Facial feature extractions result in a feature descriptor or a feature vector for each extracted facial feature. N-jets and local histograms (e.g., scale-invariant feature transform), histogram of oriented gradients (HOG), speeded-up robust features (SURF), local binary patterns (LBP), Haar wavelets, color histograms, etc. can be utilized to extract and represent facial features. The facial detection and neural network programming described herein may store location coordinates of the extracted facial features in order to overlay a graphic (e.g., an overlay image) on the face or pinpoint the exact location facial features (including distance from the eyewear device 100).

Facial detection programming of the eyewear device 100 runs repeatedly at certain time intervals, as long as the eyewear device 100 is powered and the user is active. Various optimizations to conserve battery power are implemented in the eyewear device 100. The image capture interval is adjustable in order to optimize the power consumption. In one example, the face detection programming is not run (e.g., executed) if the eyewear device 100 is running another application. In another example, the face detection programming is not run if the environment is dark, for example, based on an ambient light sensor measurement. If no ambient light sensor is available in the eyewear device 100, the time interval between which the face detection programming is run is increased. If no objects are detected in scenes over multiple images, the time interval between capturing images is also increased. If the eyewear device 100 finds a face, the time interval may be extended to 10 seconds or more.

Figure 3A:
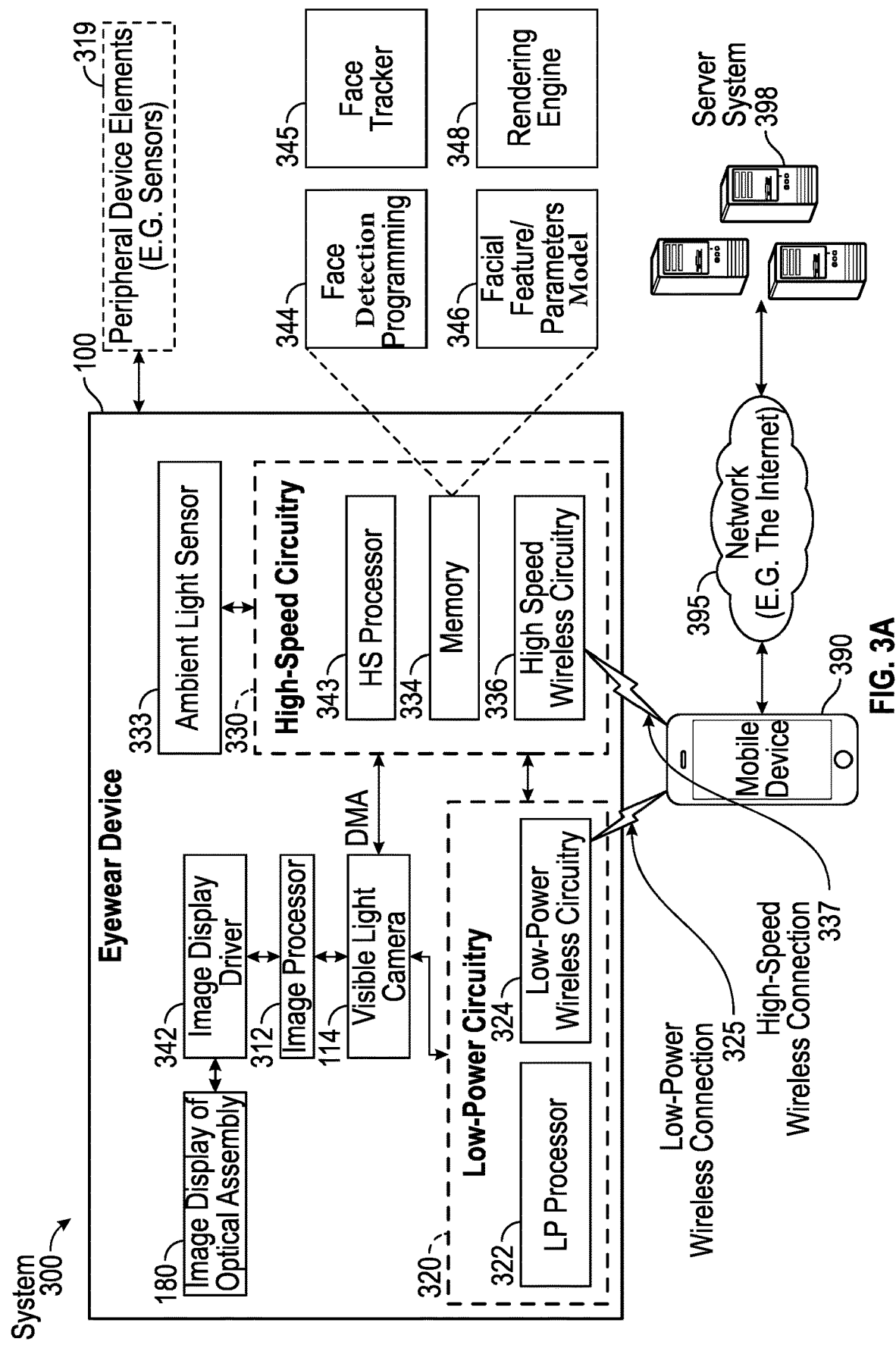
FIG. 3A is a high-level functional block diagram of an example face tracking system including the eyewear device, a mobile device, and a server system connected via various networks.
Figure 3B:
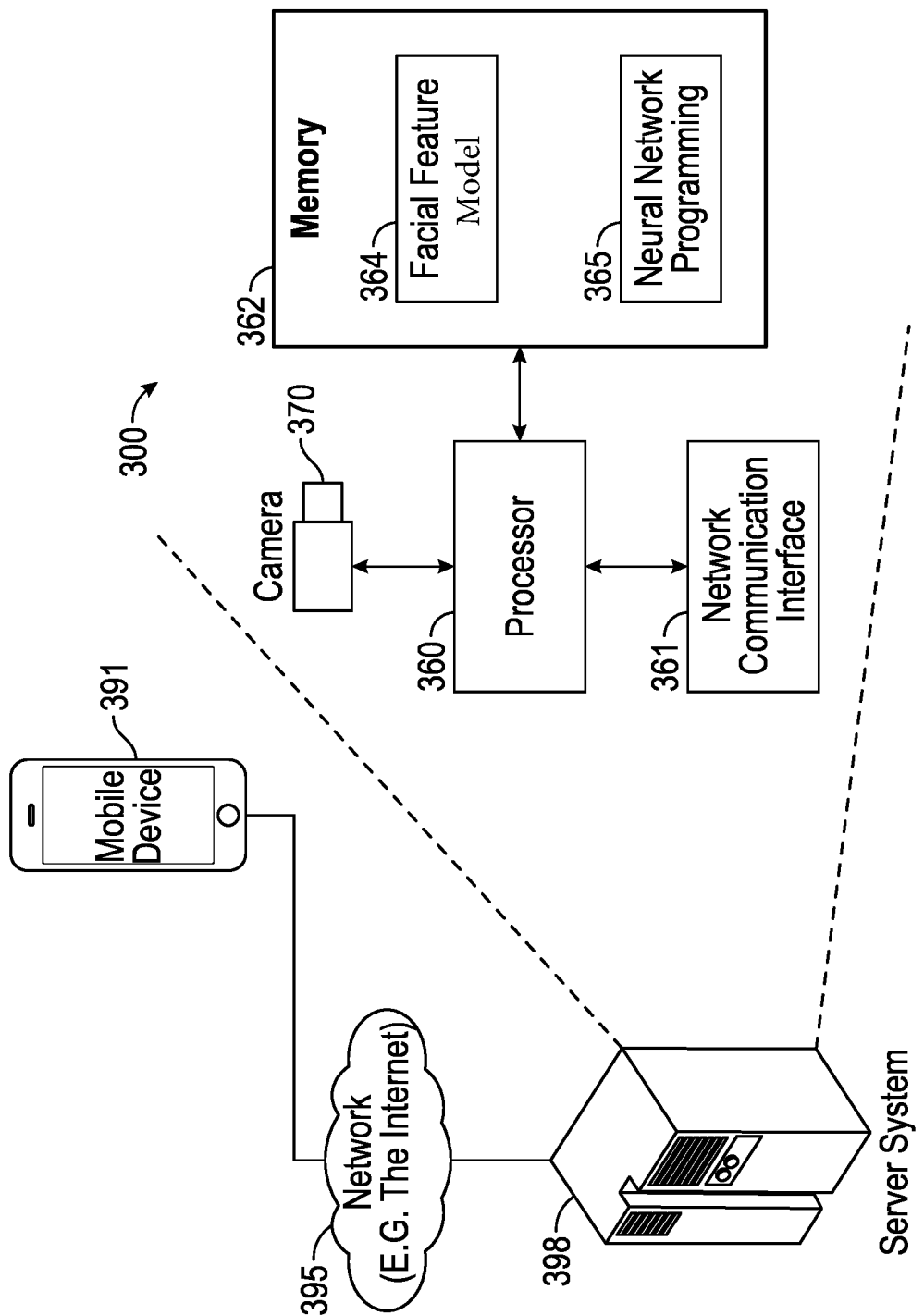
FIG. 3B shows an example of a hardware configuration for the server system of the face tracking system of FIG. 3A, in simplified block diagram form.
Figure 3C:
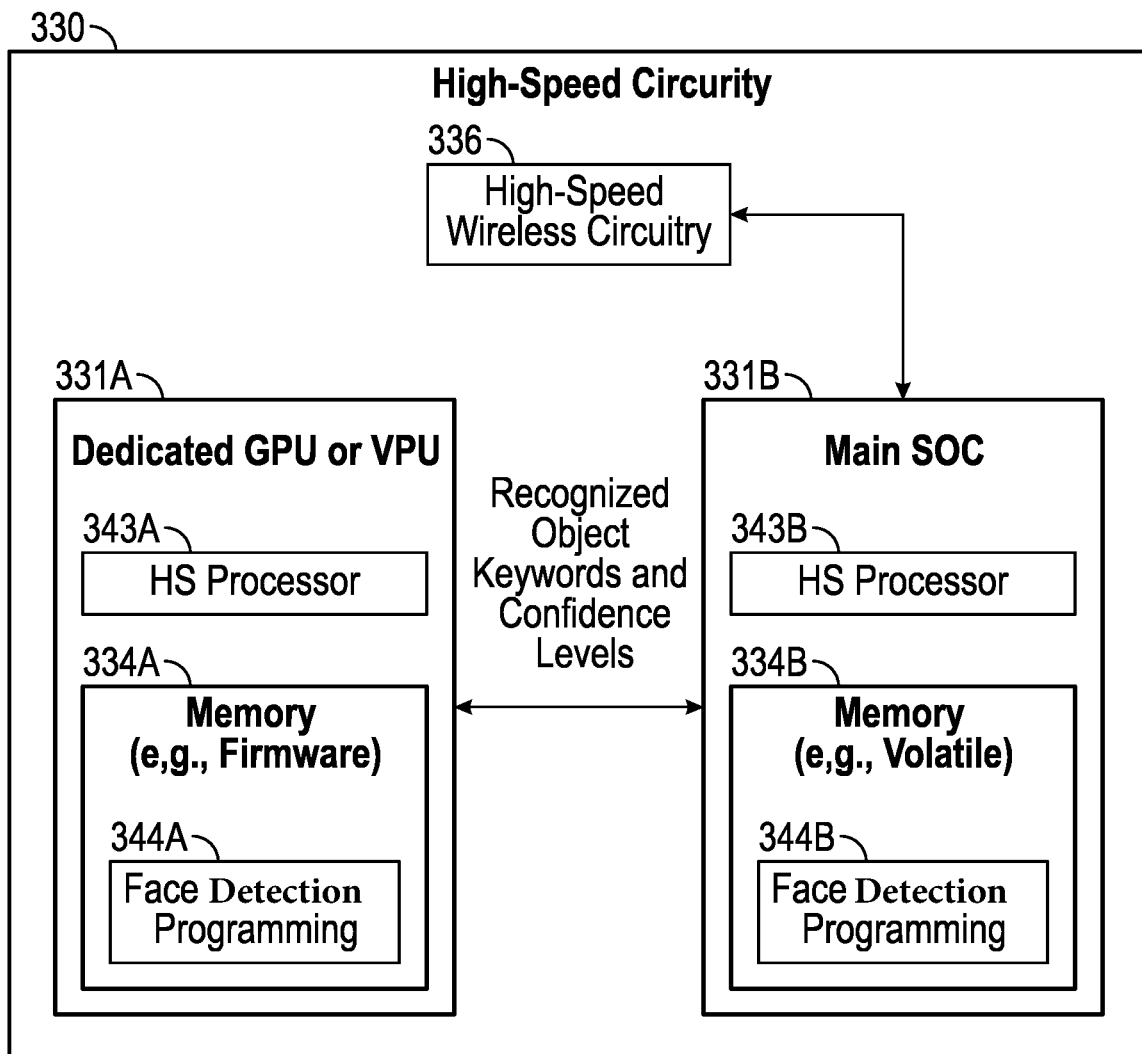
FIG. 3C shows an example of an optimized hardware architecture configuration for the high-speed circuitry of the eyewear device of the face tracking system of FIGS. 3A and 3B, in simplified block diagram form.

The foregoing functionality can be embodied in programming instructions found in one or more components of the system as further described in FIGS. 3A, 3B, and 3C. For example, the neural network programming 365 of the system server 398 and the face detection programming 344 of the eyewear device 100.

Figure 1B:
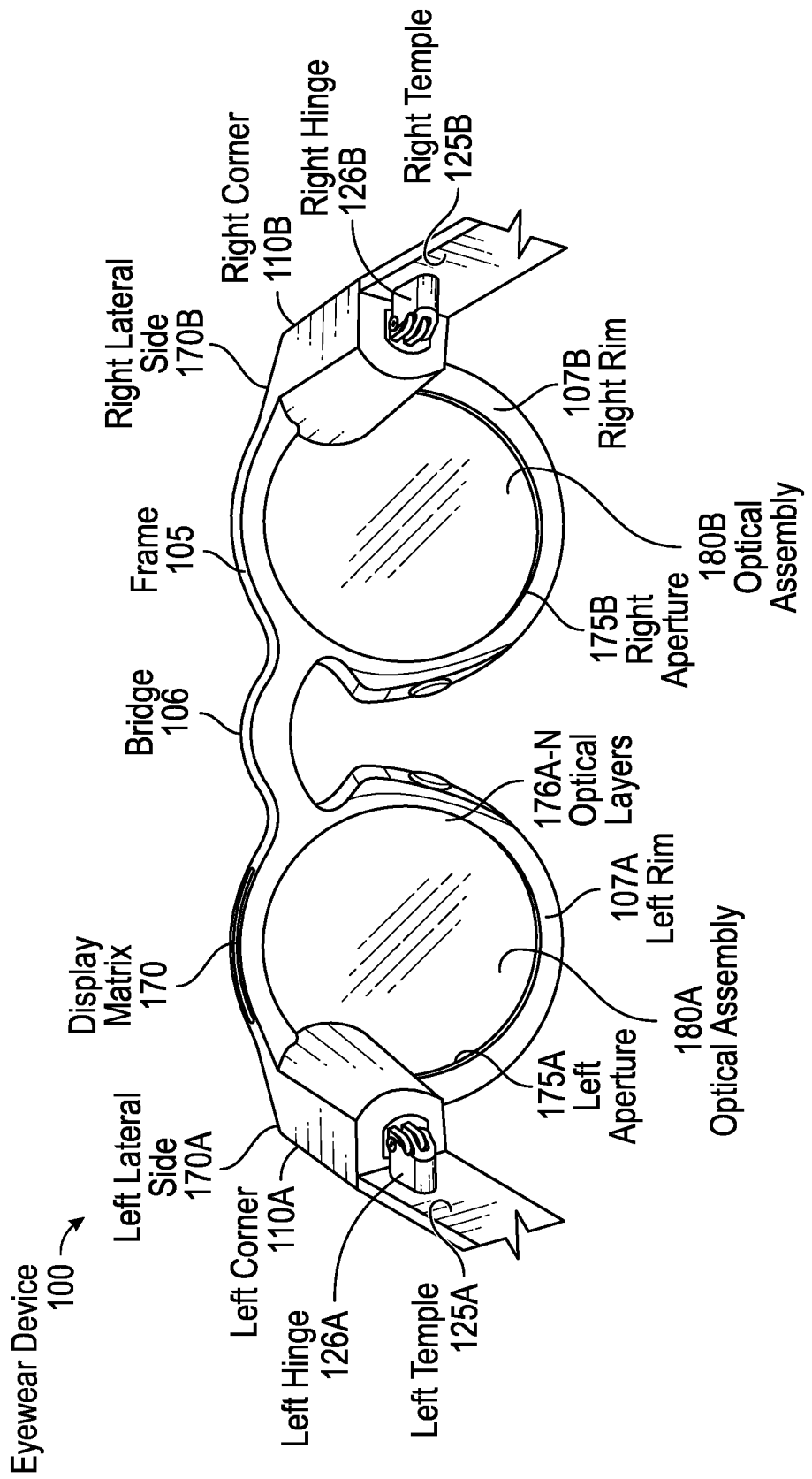
FIGS. 1B and 1C are rear views of example hardware configurations of the eyewear device of FIG. 1A, including two different types of image displays.
Figure 1C:
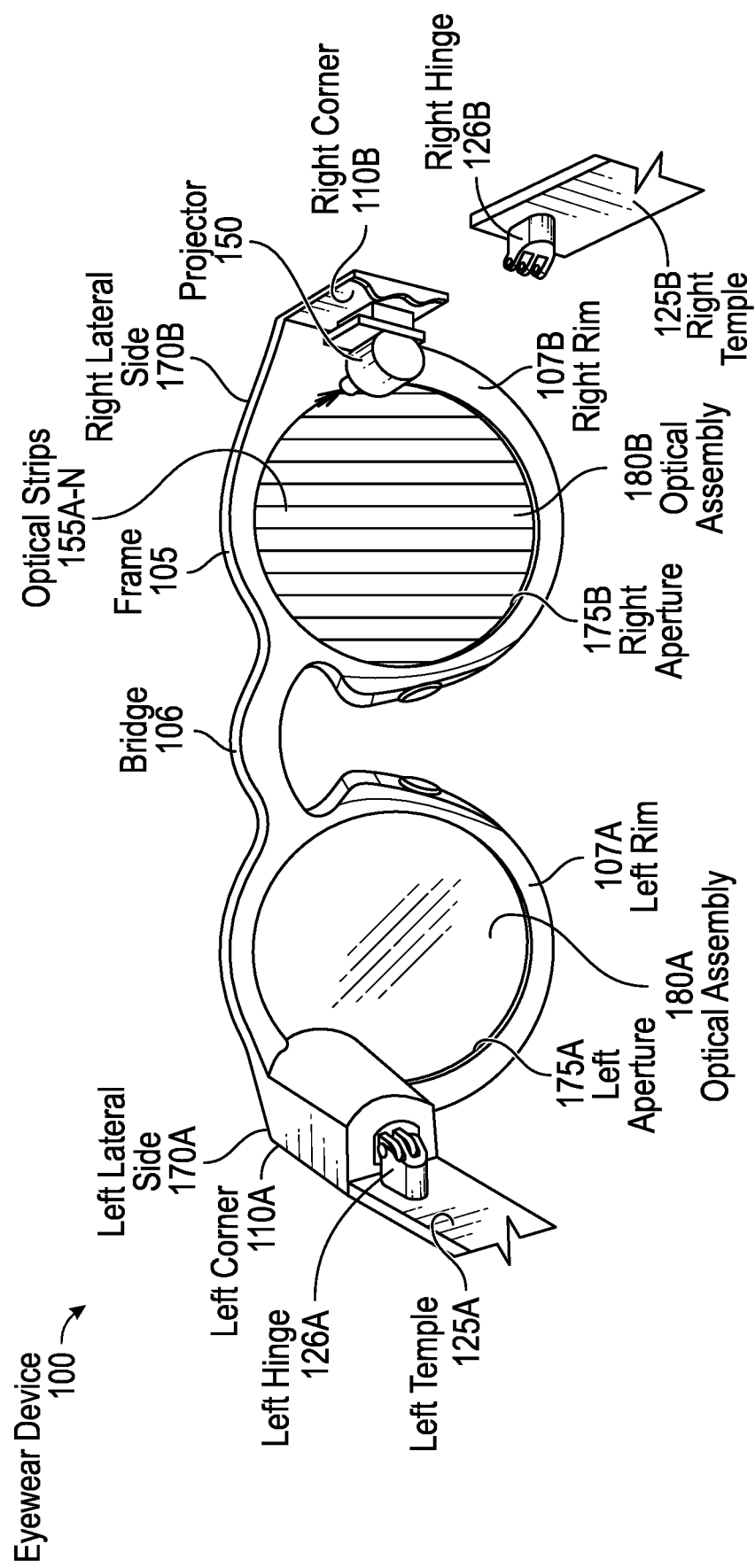

As shown in FIGS. 1A, 1B, and 1C, the eyewear device 100 is in a form for wearing by a user, which are eyeglasses in the example of FIGS. 1A, 1B, and 1C. The eyewear device 100 can take other forms and may incorporate other types of frameworks, for example, a headgear, a headset, or a helmet. In the eyeglasses example, eyewear device 100 includes a frame 105 including a left rim 107A connected to a right rim 107B via a bridge 106 adapted for a nose of the user. The left and right rims 107A-B include respective apertures 175A-B, which hold a respective optical assembly 180A-B. Optical assembly 180A-B can include various optical layers 176A-N and an image display device. The left and right temples 125A-B extend from respective lateral sides of the frame 105, for example, via respective left and right corners 110A-B. A substrate or materials forming the temple 125A-B can include plastic, acetate, metal, or a combination thereof. The corners 110A-B can be integrated into or connected to the frame 105 on the lateral side FIGS. 1B and 1C are rear views of example hardware configurations of the eyewear device 100 of FIG. 1A, including two different types of image displays. In one example, the image display of optical assembly 180A-B includes an integrated image display. As shown in FIG. 1B, the optical assembly 180A-B includes a suitable display matrix 170 of any suitable type, such as a liquid crystal display (LCD), an organic light-emitting diode (OLED) display, or any other such display. The optical assembly 180A-B also includes an optical layer or layers 176, which can include lenses, optical coatings, prisms, mirrors, waveguides, optical strips, and other optical components in any combination.

The optical layers 176A-N can include a prism having a suitable size and configuration and including a first surface for receiving light from display matrix and a second surface for emitting light to the eye of the user. The prism of the optical layers 176A-N extends over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism is sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the display matrix 170, and the light travels through the prism so that the image viewed from the second surface is larger in one or more dimensions than the image emitted from the display matrix 170.

In another example, the image display device of optical assembly 180A and 180B includes a projection image display as shown in FIG. 1C. The optical assembly 180A-B includes a laser projector 150, which is a three-color laser projector using a scanning mirror or galvanometer. During operation, an optical source such as a laser projector 150 is disposed in or on one of the temples 125A-B of the eyewear device 100. Optical assembly 180A and 180B includes one or more optical strips 155A-N spaced apart across the width of the lens of the optical assembly 180A and 180B or across a depth of the lens between the front surface and the rear surface of the lens.

As the photons projected by the laser projector 150 travel across the lens of the optical assembly 180A and 180B, the photons encounter the optical strips 155A-N. When a particular photon encounters a particular optical strip, the photon is either redirected towards the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A-B, the eyewear device 100 can include other arrangements, such as a single or three optical assemblies, or the optical assembly 180A-B may have arranged different arrangement depending on the application or intended user of the eyewear device 100.

As further shown in FIGS. 1B and 1C, eyewear device 100 includes a left corner 110A adjacent the left lateral side 170A of the frame 105 and a right corner 110B adjacent the right lateral side 170B of the frame 105. The corners 110A-B may be integrated into the frame 105 on the respective lateral sides 170A-B (as illustrated) or implemented as separate components attached to the frame 105 on the respective sides 170A-B. Alternatively, the corners 110A-B may be integrated into temples 125A-B attached to the frame 105.

In one example, the produced visible output on the optical assembly 180A-B of the eyewear device 100 may be an overlay image that overlays at least a portion of a face being tracked by the eyewear device 100. In one example the optical assemblies 180A-B are see-through displays that present the overlay image as an overlay on the face(s) that the wearer is viewing through the lenses of the optical assembly. In another example the optical assemblies 180A-B are not see-through displays (e.g., are opaque displays) that present the overlay image by combining the overlay with images captured by the cameras 114 of the eyewear device for presentation to the user on the displays.

Figure 2:
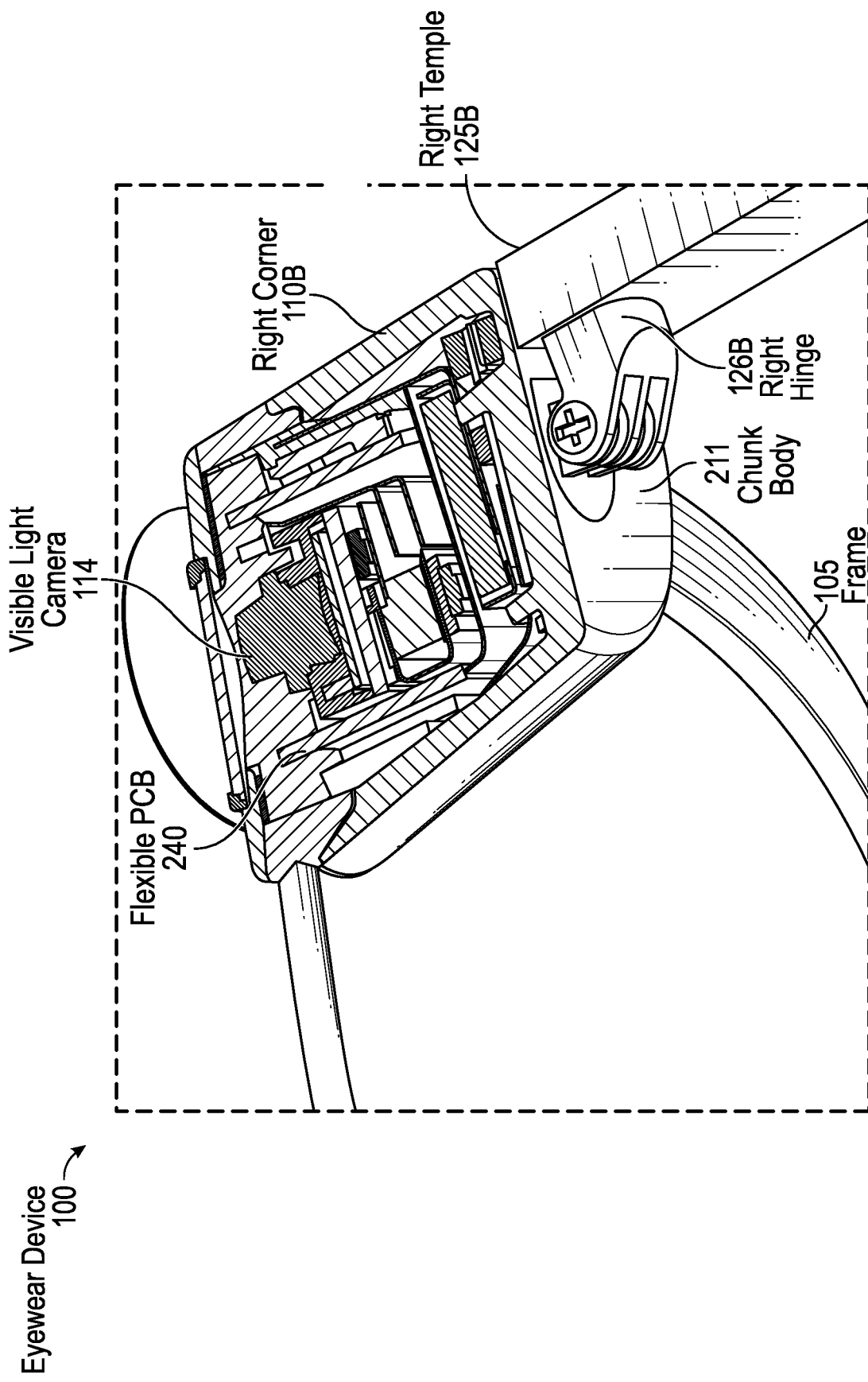
FIG. 2 is a top cross-sectional view of a corner of the eyewear device of FIG. 1A depicting the visible light camera and a circuit board.

FIG. 2 is a top cross-sectional view of the corner of the eyewear device 100 of FIG. 1A depicting the visible light camera 114 and a circuit board. As shown, the eyewear device 100 includes the visible light camera 114 and a circuit board, which may be a flexible printed circuit board (PCB) 240. A right corner 110B is connected to a right temple 125B of the eyewear device 100 via the right hinge 126B. In some examples, components of the visible light camera 114, the flexible PCB 240, or other electrical connectors or contacts may be located on the right temple 125B or the right hinge 126B. A left corner 110A is connected to a left temple 125A of the eyewear device 100 via the left hinge 126A. In some examples, components of the visible light camera 114, the flexible PCB 240, or other electrical connectors or contacts may be located on the left temple 125A or the left hinge 126A.

The right corner 110B includes corner body 211 and a corner cap, but the corner cap is removed in the cross-section of FIG. 2. Disposed inside the right corner 110B are various interconnected circuit boards, such as PCBs or flexible PCBs, that include controller circuits for a visible light camera 114, microphone(s), low-power wireless circuitry (e.g., for wireless short-range network communication via Bluetooth™), and high-speed wireless circuitry (e.g., for wireless local area network communication via WiFi).

The visible light camera 114 is coupled to or disposed on the flexible PCB 240 and covered by a visible light camera cover lens, which is aimed through opening(s) formed in the right corner 110B. In some examples, the frame 105 connected to the right corner 110B includes the opening(s) for the visible light camera cover lens. The frame 105 includes a front-facing side configured to face outward away from the eye of the user. The opening for the visible light camera cover lens is formed on and through the front-facing side. In the example, the visible light camera 114 has an outward facing field of view with a line of sight of the user of the eyewear device 100. The visible light camera cover lens can also be adhered to an outward facing surface of the right corner 110B in which an opening is formed with an outward facing field of view, but in a different outward direction. The coupling can also be indirect via intervening components.

Flexible PCB 240 is disposed inside the right corner 110B and is coupled to one or more other components housed in the right corner 110B. Although shown as being formed on the circuit boards of the right corner 110B, the visible light camera 114 can be formed on the circuit boards of the left corner 110A, the temples 125A-B, or frame 105.

FIG. 3A is a high-level functional block diagram of an example face tracking system 300. The face tracking system 300 includes a wearable device, which is the eyewear device 100 in the example. The wearable device can communicate via one or more wireless networks or wireless links with mobile device 390 or server system 398. The face tracking system 300 further includes a mobile device 390 and server system 398. Mobile device 390 may be a smartphone, tablet, laptop computer, access point, or any other such device capable of connecting with eyewear device 100 using both a low-power wireless connection 325 and a high-speed wireless connection 337. Mobile device 390 is connected to server system 398 and network 395. The network 395 may include any combination of wired and wireless connections.

Eyewear device 100 includes a visible light camera 114, image display of the optical assembly 180, image display driver 342, image processor 312, low-power circuitry 320, and high-speed circuitry 330. The components shown in FIG. 3A for the eyewear device 100 are located on one or more circuit boards, for example a PCB or flexible PCB, in the temples. Alternatively, or additionally, the depicted components can be located in the corners, frames, hinges, or bridge of the eyewear device 100. Visible light camera 114 can include digital camera elements such as a complementary metal-oxide-semiconductor (CMOS) image sensor, charge coupled device, a lens, or any other respective visible or light capturing elements that may be used to capture data, including images of scenes with unknown objects. Memory 334 includes face detection programming 344, a face tracker 345, and a facial feature/parameter model 346 to perform the functions described herein for face tracking. Memory 334 additionally includes a rendering engine 348 for rendering overlay images over the face(s) on the displays 180A and 180B using image processor 312 and image display driver 342.

In one example, face detection programming 344 and face tracker 345 implement instructions to cause the eyewear device 100 to capture, via the visible light camera 114, an image of a scene including a face and to track the face(s) as it moves with respect to the eyewear device 100. Initially, one or more anchor points on the face are acquired. The tasks of acquiring a face, related anchor points, and their locations are performed according to any of a variety of conventional face detection/tracking algorithms. Face tracking is accomplished by establishing a three-dimensional coordinate system and searching for and identifying a face and its location relative to the coordinate system. Any of a variety of face tracking applications to perform face tracking are available on different kinds of devices. A suitable face tracking application locates and tracks the motion of a face relative to six degrees of freedom; in other words, motion in relation to six axes (x, y, z, pitch, roll, yaw). After the face is acquired, the face tracking application keeps track of the location and orientation of the face using any of a variety of available tracking techniques, generally referred to as simultaneous localization and mapping (SLAM). SLAM can, for example, be used to track the location and orientation of a user in motion relative to a virtual reality; for example, a virtual world. SLAM can also be used to track the location and orientation of a user in motion relative to augmented reality, in which one or more virtual objects are overlaid or otherwise displayed together with a physical reality.

As shown in FIG. 3A, high-speed circuitry 330 includes high-speed processor 343, memory 334, and high-speed wireless circuitry 336. In the example, the image display driver 342 is coupled to the high-speed circuitry 330 and operated by the high-speed processor 343 in order to drive the image display of the optical assembly 180. High-speed processor 343 may be any processor capable of managing high-speed communications and operation of any general computing system needed for eyewear device 100. High-speed processor 343 includes processing resources needed for managing high-speed data transfers on high-speed wireless connection 337 to a wireless local area network (WLAN) using high-speed wireless circuitry 336. In some examples, the high-speed processor 343 executes an operating system such as a LINUX operating system or other such operating system of the eyewear device 100 and the operating system is stored in memory 334 for execution. In addition to any other responsibilities, the high-speed processor 343 executing a software architecture for the eyewear device 100 is used to manage data transfers with high-speed wireless circuitry 336. In some examples, high-speed wireless circuitry 336 is configured to implement Institute of Electrical and Electronic Engineers (IEEE) 802.11 communication standards, also referred to herein as Wi-Fi. In other examples, other high-speed communications standards may be implemented by high-speed wireless circuitry 336.

Low-power wireless circuitry 324 and the high-speed wireless circuitry 336 of the eyewear device 100 can include short range transceivers (Bluetooth™) and wireless wide, local, or wide area network transceivers (e.g., cellular or WiFi). Mobile device 390, including the transceivers communicating via the low-power wireless connection 325 and high-speed wireless connection 337, may be implemented using details of the architecture of the eyewear device 100, as can other elements of network 395.

Memory 334 includes any storage device capable of storing various data and applications, including, among other things, camera data generated by the visible light camera 114 and the image processor 312, as well as images generated for display by the image display driver 342 on the image display of the optical assembly 180. While memory 334 is shown as integrated with high-speed circuitry 330, in other examples, memory 334 may be an independent standalone element of the eyewear device 100. In some examples, electrical routing lines may provide a connection through a chip that includes the high-speed processor 343 from the image processor 312 or low-power processor 323 to the memory 334. In other examples, the high-speed processor 343 may manage addressing of memory 334 such that the low-power processor 323 will boot the high-speed processor 343 any time that a read or write operation involving memory 334 is needed.

As further shown in FIG. 3B, server system 398 may be one or more computing devices as part of a service or network computing system, for example, that include a processor 360, a memory 362, and network communication interface 361 to communicate over the network 395 with the mobile device 390 and eyewear device 100. The memory 362 includes a facial feature/parameter model 364 and neural network programming 365. Execution of the neural network programming 365 by the processor 360 configures the server system 398 to perform some or all of the functions described herein.

In one example, server system 398 receives, via the network 395, the image of the scene with the face from the eyewear device 100 via the mobile device 390. In another example, server system 398 connects, via the network communication interface 361, to the eyewear device 100 via the mobile device 390, the wearable device 399, or another computing device of a different user over the network 395.

The facial feature/parameter model 346 of the eyewear device 100 can be a mirror image of the facial feature/parameter model 364 of the server system 398. Facial feature/parameter model 345 of the eyewear device 100 is stored locally in a read-only memory (ROM), erasable programmable read-only memory (EPROM), or flash memory of high-speed circuitry 330.

Eyewear device 100 further includes an ambient light sensor 333 and detects, via the ambient light sensor 333, the illuminance of the environment in which the eyewear device 100 is located. The eyewear device 100 determines whether the detected illuminance of the environment exceeds an illuminance brightness threshold or is below an illuminance darkness threshold. Upon determining that the detected illuminance exceeds the illuminance brightness threshold or is below the illuminance darkness threshold, the eyewear device 100 throttles back the sampling interval of the capturing, via the camera 114, the image of the scene with the face. The ambient light-based adjustment to the sampling interval for capturing the image of the scene with the face may be implemented in the application layer of the face detection programming 344. Although not shown, eyewear device 100 can also include a proximity sensor, which detects if the user is currently wearing the eyewear device 100, to optimize power consumption.

Eyewear device 100 is connected with a host computer. For example, the eyewear device 100 is paired with the mobile device 390 via the high-speed wireless connection 337 or connected to the server system 398 via the network 395. In one example, eyewear device 100 receives images that can be overlaid with a face being tracked with the eyewear device 100.

Output components of the eyewear device 100 include visual components, such as the image display of optical assembly 180 as described in FIGS. 1B and 1C (e.g., a display such as a liquid crystal display (LCD), a plasma display panel (PDP), a light emitting diode (LED) display, a projector, or a waveguide). The image display of the optical assembly 180 is driven by the image display driver 342. The output components of the eyewear device 100 further include acoustic components (e.g., speakers), haptic components (e.g., a vibratory motor), other signal generators, and so forth. The input components of the eyewear device 100, the mobile device 390, and server system 398, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Face tracking system 300 may optionally include additional peripheral device elements 319. Such peripheral device elements 319 may include biometric sensors, additional sensors, or display elements integrated with eyewear device 100. For example, peripheral device elements 319 may include any I/O components including output components, motion components, position components, or any other such elements described herein.

For example, the biometric components of the face tracking system 300 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 325 and 337 from the mobile device 390 via the low-power wireless circuitry 324 or high-speed wireless circuitry 336.

FIG. 3C shows an example of an optimized hardware architecture configuration for the high-speed circuitry 330 of the eyewear device 100 of the face tracking system 300 of FIG. 3A, in simplified block diagram form. To enhance runtime optimization and speed of execution, the face detection programming 344 may include a subset of instruction (instructions 344A) in firmware and another subset of instructions (instructions 344B) in the application layer. In this example of FIG. 3C, an additional optimization is shown.

As shown in FIG. 3C, the high-speed circuitry 330 of the eyewear device 100 includes at least two systems on a chip (SOCs) 331A-B. The first SOC 331A is a dedicated graphics processing unit (GPU) or a vision processing unit (VPU), which includes a first processor 343A; a first memory 334A (e.g., firmware); and firmware programming in the first memory 334A. Execution of the firmware layer of the face detection programming 344A by the first processor 343A of the dedicated GPU or VPU 331A configures the eyewear device 100 to: capture, via the visible light camera 114, the images of the scene with the face and track positional information of the face in the images. The high-speed circuitry 330 further includes another second system on a chip (SOC) unit 331B. The second SOC 331B of the high-speed circuitry 330 is a main SOC which includes a second processor 343B, a second memory 334B, and application layer of face detection programming 344B in the second memory 334B. Execution of the application layer of the face detection programming 344B by the second processor 343B configures the eyewear device 100 to generate an overlay responsive to the positional information. The dedicated GPU or VPU SOC 331B of the high-speed circuitry 330 has access to the visible light camera 114 via direct memory access (DMA).

In one example, image processor 312 comprises a microprocessor integrated circuit (IC) customized for processing image sensor data from the visible light camera 114, along with volatile memory used by the microprocessor to operate.

In order to reduce the amount of time that image processor 312 takes when powering on to processing data, a non-volatile read only memory (ROM) may be integrated on the IC with instructions for operating or booting the image processor 312. This ROM may be minimized to match a minimum size needed to provide basic functionality for gathering sensor data from visible light camera 114, such that no extra functionality that would cause delays in boot time are present. The ROM may be configured with direct memory access (DMA) to the volatile memory of the microprocessor of image processor 312. DMA allows memory-to-memory transfer of data from the ROM to system memory of the image processor 312 independent of operation of a main controller of image processor 312. Providing DMA to this boot ROM further reduces the amount of time from power on of the image processor 312 until sensor data from the visible light camera 114 can be processed and stored. In some examples, minimal processing of the camera signal from the visible light camera 114 is performed by the image processor 312, and additional processing may be performed by applications operating on the mobile device 390 or server system 398.

Low-power circuitry 320 includes low-power processor 323 and low-power wireless circuitry 324. These elements of low-power circuitry 320 may be implemented as separate elements or may be implemented on a single IC as part of a system on a single chip. Low-power processor 323 includes logic for managing the other elements of the eyewear device 100. Low-power processor 323 is configured to receive input signals or instruction communications from mobile device 390 via low-power wireless connection 325. Additional details related to such instructions are described further below. Low-power wireless circuitry 324 includes circuit elements for implementing a low-power wireless communication system via a short-range network. Bluetooth™ Smart, also known as Bluetooth™ low energy, is one standard implementation of a low power wireless communication system that may be used to implement low-power wireless circuitry 324. In other examples, other low power communication systems may be used.

Figure 4:
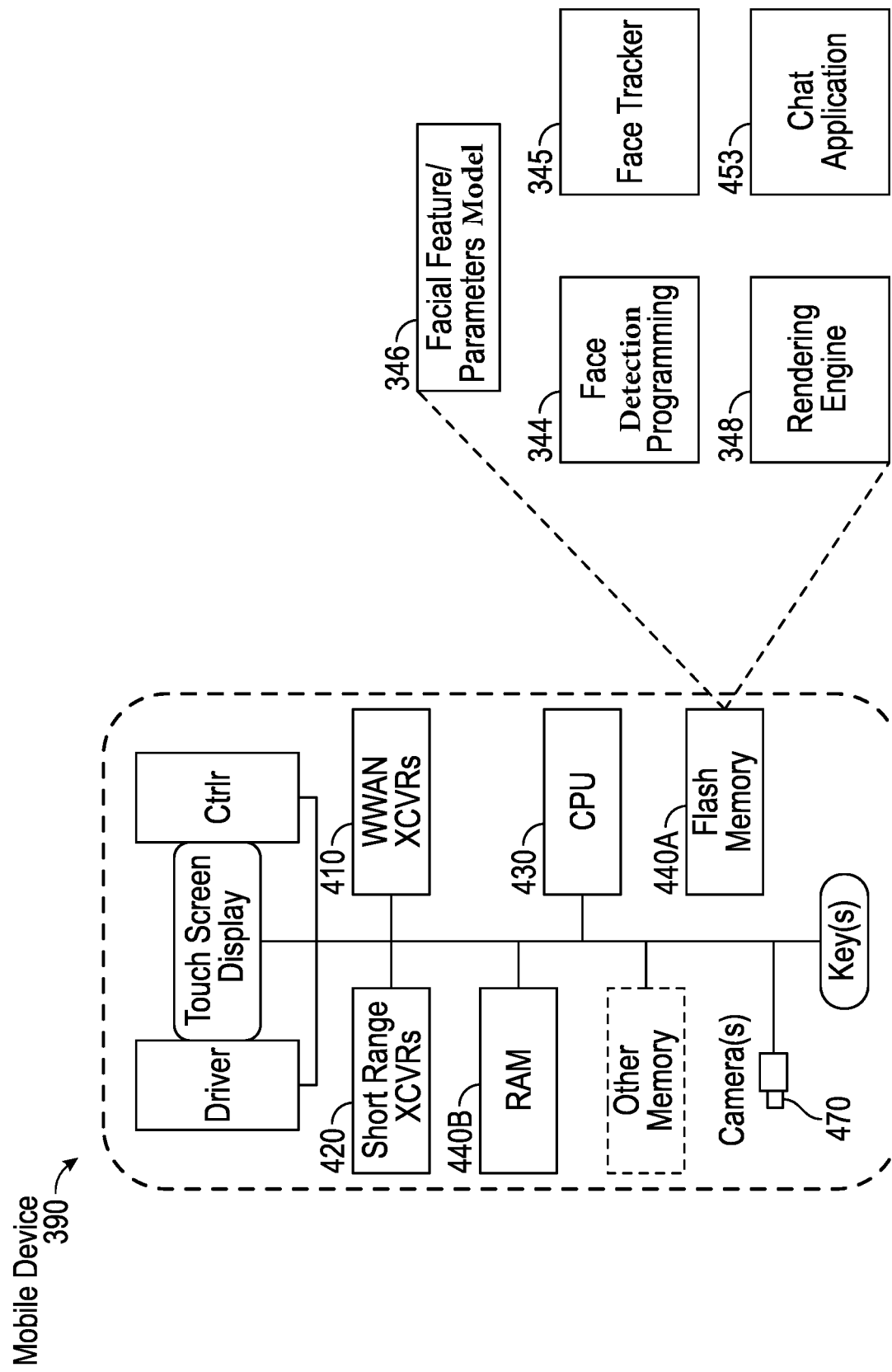
FIG. 4 shows an example of a hardware configuration for the mobile device of the face tracking system of FIGS. 3A and 3B, in simplified block diagram form.

Mobile device 390 and elements of network 395, low-power wireless connection 325, and high-speed wireless architecture 337 may be implemented using details of the architecture of mobile device 390, for example utilizing the short range XCVRs and WWAN XCVRs of mobile device 390 described in FIG. 4.

FIG. 4 is a high-level functional block diagram of an example of a mobile device 390 that provides processing for the face tracking system 300 of FIGS. 3A and 3B. Shown are elements of a touch screen type of mobile device 390 having face detection programming 344 loaded along with other applications such as chat application 453. Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 4 therefore provides a block diagram illustration of the example mobile device 390 having a touch screen display for displaying content and receiving user input as (or as part of) the user interface. Mobile device 390 also includes a camera(s) 470, such as visible light camera(s).

As shown in FIG. 4, the mobile device 390 includes at least one digital transceiver (XCVR) 410, shown as WWAN XCVRs, for digital wireless communications via a wide area wireless mobile communication network. The mobile device 390 also includes additional digital or analog transceivers, such as short range XCVRs 420 for short-range network communication, such as via NFC, VLC, DECT, ZigBee, Bluetooth™, or WiFi. For example, short range XCVRs 420 may take the form of any available two-way wireless local area network (WLAN) transceiver of a type that is compatible with one or more standard protocols of communication implemented in wireless local area networks, such as one of the Wi-Fi standards under IEEE 802.11 and WiMAX.

To generate location coordinates for positioning of the mobile device 390, the mobile device 390 can include a global positioning system (GPS) receiver. Alternatively, or additionally the mobile device 390 can utilize either or both the short range XCVRs 420 and WWAN XCVRs 410 for generating location coordinates for positioning. For example, cellular network, WiFi, or Bluetooth™ based positioning systems can generate very accurate location coordinates, particularly when used in combination. Such location coordinates can be transmitted to the eyewear device 100 over one or more network connections via XCVRs 420.

The transceivers 410, 420 (network communication interfaces) conform to one or more of the various digital wireless communication standards utilized by modern mobile networks. Examples of WWAN transceivers 410 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 410, 420 provide two-way wireless communication of information including digitized audio signals, still image and video signals, web page information for display as well as web related inputs, and various types of mobile message communications to/from the mobile device 390 for user authorization strategies.

Several of these types of communications through the transceivers 410, 420 and a network, as discussed previously, relate to protocols and procedures in support of communications with the eyewear device 100 or the server system 398 for facial detection. Such communications, for example, may transport packet data via the short range XCVRs 420 over the wireless connections 325 and 337 to and from the eyewear device 100 as shown in FIGS. 3A-C. Such communications, for example, may also transport data utilizing IP packet data transport via the WWAN XCVRs 410 over the network (e.g., Internet) 395 shown in FIGS. 3A-C. Both WWAN XCVRs 410 and short range XCVRs 420 connect through radio frequency (RF) send-and-receive amplifiers (not shown) to an associated antenna (not shown).

The mobile device 390 further includes a microprocessor, shown as CPU 430, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 430, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 430 or processor hardware in smartphone, laptop computer, and tablet.

The microprocessor 430 serves as a programmable host controller for the mobile device 390 by configuring the mobile device 390 to perform various operations, for example, in accordance with instructions or programming executable by processor 430. For example, such operations may include various general operations of the mobile device, as well as operations related to facial detection communications with the eyewear device 100 and server system 398. Although a processor may be configured by use of hardwired logic, typical processors in mobile devices are general processing circuits configured by execution of programming.

The mobile device 390 includes a memory or storage device system, for storing data and programming. In the example, the memory system may include a flash memory 440A and a random access memory (RAM) 440B. The RAM 440B serves as short term storage for instructions and data being handled by the processor 430, e.g., as a working data processing memory. The flash memory 440A typically provides longer term storage.

Hence, in the example of mobile device 390, the flash memory 440A is used to store programming or instructions for execution by the processor 430 to implement the functions described herein for facial detection. Depending on the type of device, the mobile device 390 stores and runs a mobile operating system through which specific applications, which may include the face detection programming 344 are executed. However, in some implementations, the face detection programming 344 and facial feature/parameter model 346 may be implemented in firmware or a combination of firmware and an application layer as described with the eyewear device 100. For example, the instructions to capture the image of the scene with the face, track positional information for the face, and generate an overlay may reside in firmware (e.g., with a dedicated GPU or VPU SOC) like that described with reference to the eyewear device in FIGS. 3A, 3B, and 3C. Instructions to produce the visible output to the user may reside in an application. Applications, like the face detection programming 344 and other applications, may be a native application, a hybrid application, or a web application (e.g., a dynamic web page executed by a web browser) that runs on mobile device 390. Examples of mobile operating systems include Google Android, Apple iOS (I-Phone or iPad devices), Windows Mobile, Amazon Fire OS, RIM BlackBerry operating system, or the like.

Figure 5A:
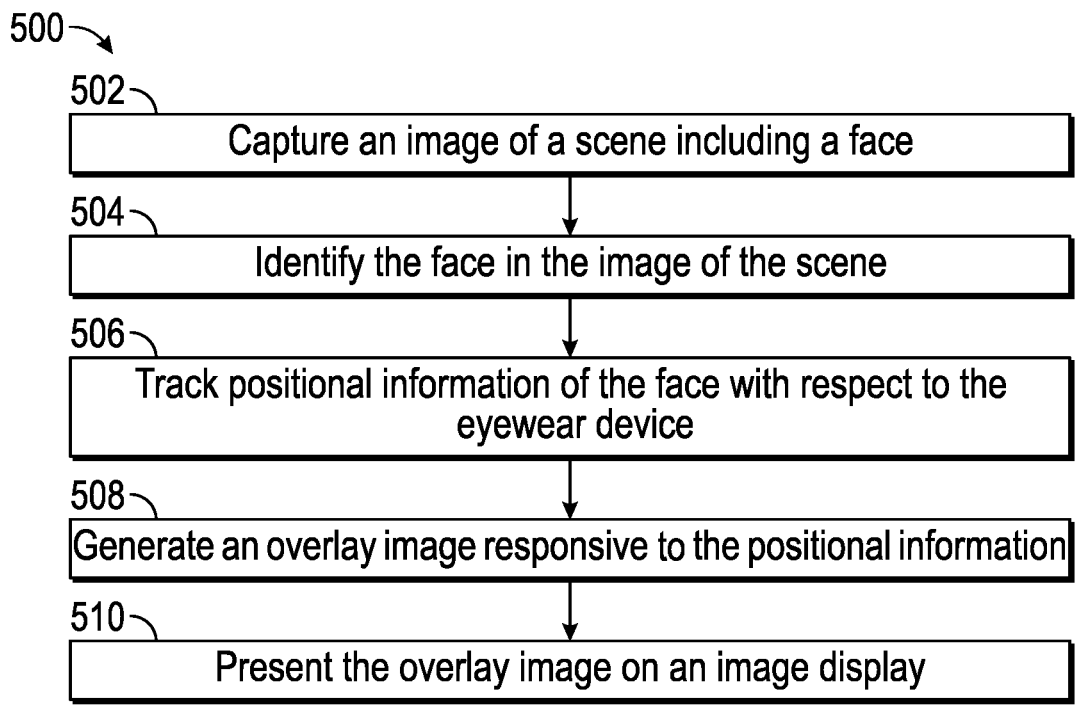
FIG. 5A is a flowchart of the operation of a wearable device or a mobile device and other components of the face tracking system of FIGS. 3A, 3B, and 3C.
Figure 5B:
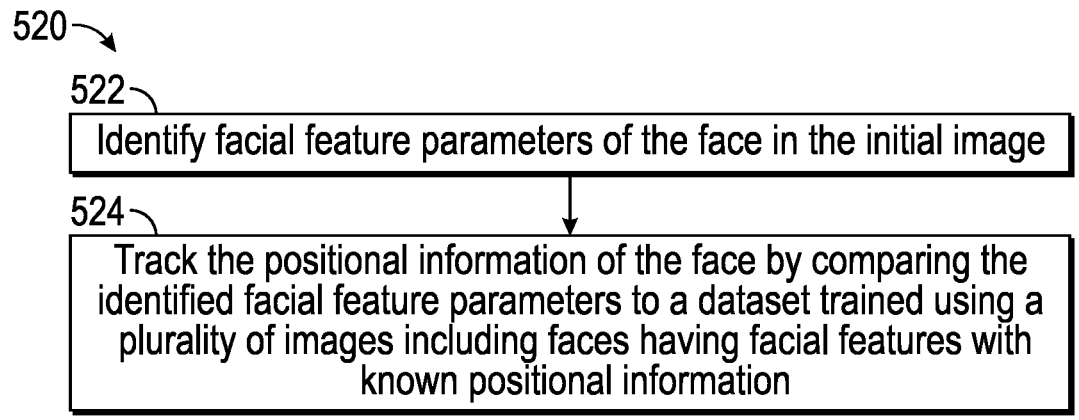
FIG. 5B is a flowchart of the operation of a wearable device or a mobile device and other components to track positional information of a face using a trained model in the face tracking system of FIGS. 3A, 3B, and 3C.
Figure 5C:
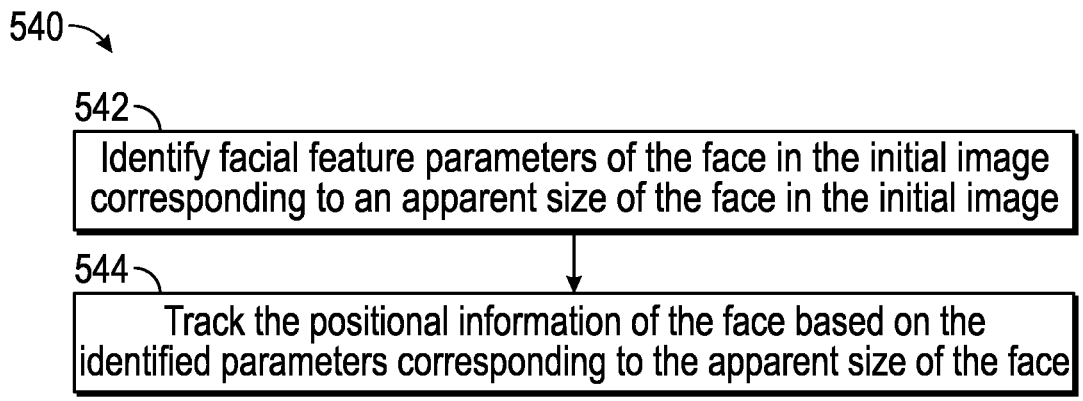
FIG. 5C is a flowchart of the operation of a wearable device or a mobile device and other components to track positional information of a face using a two-dimensional (2D) image in the face tracking system of FIGS. 3A, 3B, and 3C.

FIGS. 5A, 5B, and 5C are flowcharts 500, 520, and 540, respectively, illustrating example operation of a wearable device (e.g., an eyewear device 100) or a mobile device 390 and other components of the face tracking system 300. Although shown as occurring serially, one or more of the blocks in flow charts 500, 520, and/or 540 may be reordered or parallelized depending on the implementation.

At block 502, capture an image of a scene including a face. The image processor 312 may capture the image using visible light camera 114. In one example, image processor 312 captures images from one visible light camera 114. In another example, image processor 312 captures images from two visible light cameras 114 having overlapping fields of view.

At block 504, identify the face in the image of the scene. The high-speed circuitry 330 may identify the face using face detection programming 344 stored in memory 334.

At block 506, track positional information of the face with respect to the eyewear device. The high-speed circuitry 330 may track positional information using face tracker 345 and facial feature/parameter model 346. In one example, positional information includes distances from the camera 114 to features on the face (e.g., eyes, cheek bones).

Tracking positional information may include identifying facial feature parameters of the face in the initial image (block 522) and tracking the positional information of the face by comparing the identified facial feature parameters to a model trained using a plurality of images including faces having facial features with known positional information (block 524). Alternatively, tracking positional information may include identifying facial feature parameters of the face in the initial image corresponding to an apparent size of the face in the initial image (block 542) and tracking the positional information of the face based on the identified parameters corresponding to the apparent size of the face (block 544).

At block 508, generate an overlay image responsive the positional information. The high-speed circuitry 330 may generate the overlay image taking into account the positional information. In one example, overlay images are skewed to conform to the face if the positional information for features on the face indicate the face is turned or tilted with respect to the eyewear device 100. In another example, the size of the overlay images is adjusted based on positional information with the size being reduced if the face is further away and increased if the face is closer.

At block 510, present the overlay image on an image display. The high-speed circuitry 330 may present the overlay image to a wearer of the eyewear device 100 on optical displays 180 of the eyewear device 100. In one example, the overlay image is presented over the face being tracked. In another example, the overlay image is presented adjacent a face being tracked. In accordance with this example, audio produced by a face of a speaker being tracked may be captured by microphones and converted from speech to text (e.g., using a speech to text converter) with the resultant text presented as an overlay to a side of the speaker (e.g., above/below/right/left).

Any of the method described herein such as the facial tracking and rendering methods for the eyewear device 100, mobile device 390, and server system 398 can be embodied in one or more methods as method steps or in one or more applications as described previously. According to some examples, an "application," "applications," or "firmware" are program(s) that execute functions defined in the program, such as logic embodied in software or hardware instructions. Various programming languages can be employed to create one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application can invoke application programming interface (API) calls provided by the operating system to facilitate functionality described herein. The applications can be stored in any type of computer readable medium or computer storage device and be executed by one or more general-purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of executable code and/or associated data that is carried on or embodied in a type of machine-readable medium. For example, programming code could include code for user authorization, navigation, facial tracking or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the server system 398 or host computer of the service provider into the computer platforms of the eyewear device 100 and mobile device 390. Thus, another type of media that may bear the programming, media content or meta-data files includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system comprising:
an eyewear device, including:
a frame;
a temple extending from a lateral side of the frame;
an image display to present an overlay image to a user of the eyewear device;

a camera connected to the frame or the temple to capture an initial image of a scene the user of the eyewear device is viewing from a first perspective, the scene including a face;

another camera connected to the frame, the temple, or another temple and positioned to capture another initial image of the scene including the face from another perspective;

a processor coupled to the eyewear device and connected to the camera and the other camera;

a memory accessible to the processor; and programming in the memory, wherein execution of the programming by the processor configures the system to perform functions, including functions to:

capture, via the camera, the initial image of the scene including the face;

capture, via the other camera, the other initial image of the scene including the face;

identify the face in the initial image of the scene;

identify the face in the other initial image of the scene;

identify facial feature parameters of the face in the initial image corresponding to an apparent size of the face in the initial image;

identify the facial feature parameters of the face in the other initial image;

track positional information of the face with respect to the eyewear device by comparing the identified facial feature parameters in both the initial image and the other initial image to a model trained using a plurality of images including faces having facial features with known positional information;

generate the overlay image responsive to the tracked positional information; and present the overlay image on the image display.

2. The system of claim 1, wherein the image display is a see-through display and the overlay image is presented on the see-through display over or adjacent the face in the scene.

3. The system of claim 1, wherein the image display is an opaque display and execution of the programming by the processor further configures the eyewear device to perform a function to: merge the overlay image and the initial image to generate a merged overlay image; wherein the function to present the overlay image presents the merged overlay image.

4. The system of claim 1, wherein the system further comprises: a machine learning model trained using the plurality of images.

5. The system of claim 1, wherein the positional information includes a distance to a facial feature of the face.

6. A method comprising:

capturing, via a camera of an eyewear device, an initial image of a scene a user of the eyewear device is viewing from a first perspective, the scene including a face;

capturing another initial image of the scene including the face from another perspective;

identifying the face in the initial image of the scene;

identifying the face in the other initial image of the scene;

identifying facial feature parameters of the face in the initial image corresponding to an apparent size of the face in the initial image;

identifying the facial feature parameters of the face in the other initial image;

tracking positional information of the face with respect to the eyewear device by comparing the identified facial feature parameters in both the initial image and the other initial image to a model trained using a plurality of images including faces having facial features with known positional information;

generating an overlay image responsive to the tracked positional information of the face; and presenting the overlay image on an image display.

7. The method of claim 6, wherein the image display is a see-through display of the eyewear device and wherein presenting the overlay image comprises presenting the overlay image on the see-through display over or adjacent the face in the scene.

8. The method of claim 6, wherein the image display is an opaque display of the eyewear device and wherein the method further comprises: merging the overlay image and the initial image to generate a merged overlay image, wherein presenting the overlay image comprises presenting the merged overlay image.

9. The method of claim 6, wherein the method further comprises: training a machine learning model using the plurality of image to generate the model.

10. The method of claim 6, wherein the positional information includes a distance to a facial feature of the face.

11. A non-transitory computer-readable medium storing program code which, when executed, is operative to cause an electronic processor to perform the steps of:

capturing, via a camera of an eyewear device, an initial image of a scene a user of the eyewear device is viewing, the scene including a face;

capturing another initial image of the scene including the face from another perspective;

identifying the face in the initial image of the scene;

identifying the face in the other initial image of the scene;

identifying facial feature parameters of the face in the initial image corresponding to an apparent size of the face in the initial image;

identifying the facial feature parameters of the face in the other initial image;

tracking positional information of the face with respect to the eyewear device by comparing the identified facial feature parameters in both the initial image and the other initial image to a model trained using a plurality of images including faces having facial features with known positional information;

generating an overlay image responsive to the tracked positional information; and presenting the overlay image on an image display.

12. The non-transitory computer-readable medium of claim 11, wherein the image display is a see-through display of the eyewear device and wherein presenting the overlay image comprises presenting the overlay image on the see-through display over or adjacent the face in the scene.

13. The non-transitory computer-readable medium of claim 11, wherein the image display is an opaque display of the eyewear device and wherein the program code is operative to cause an electronic processor to perform the further step of: merging the overlay image and the initial image to generate a merged overlay image; wherein presenting the overlay image comprises presenting the merged overlay image.

14. The non-transitory computer-readable medium of claim 11, wherein the program code is operative to cause an electronic processor to perform the further step of: training a machine learning model using the plurality of image to generate the model.

* * * * *